United States Patent [19]

Hickman et al.

[11] Patent Number: 5,361,361
[45] Date of Patent: Nov. 1, 1994

[54] HIERARCHICAL INTEGRATED HELP UTILITY FOR A COMPUTER SYSTEM

[75] Inventors: D. Anne Hickman, Aloha; Peter Kaufman, Banks; Adam Trent, Aloha; Deborah A. Bouchette, Hillsboro, all of Oreg.

[73] Assignee: Intel Corporation, Santa Clara, Calif.

[21] Appl. No.: 130,116

[22] Filed: Sep. 30, 1993

[51] Int. Cl.[5] .............................................. G06F 9/00
[52] U.S. Cl. ............................. 395/700; 364/DIG. 1; 364/286; 364/286.1; 364/286.2; 364/286.3
[58] Field of Search ................ 395/700; 364/DIG. 1, 364/286, 286.1, 286.2, 286.3

[56]   References Cited
U.S. PATENT DOCUMENTS 4,648,062  3/1987  Johnson et al. ..................... 364/900
4,992,972  2/1991  Brooks et al. ....................... 364/900

FOREIGN PATENT DOCUMENTS 325443  7/1989  European Pat. Off. ..... D06F 3/023

Primary Examiner—Gareth D. Shaw
Assistant Examiner—A. Katbab
Attorney, Agent, or Firm—Blakely, Sokoloff, Taylor & Zafman

[57] ABSTRACT

An improved method and apparatus for hierarchically integrating help information across multiple applications is disclosed. In a computer system having a first application program including a first set of help files and a second application program including a second set of help files, the integrated help utility of the present invention includes a process for displaying selected information in the first and second help files, the process comprises the steps of: 1) providing a first help directory associated with the first set of help files, the first help directory includes a first plurality of topic items corresponding to information provided in the first set of help files; 2) providing a second help directory associated with the second set of help files, the second help directory includes a second plurality of topic items corresponding to information provided in the second set of help files; 3) displaying the first plurality of topic items concurrently with the second plurality of topic items; 4) selecting a selected one of the topic items from either the first plurality of topic items or the second plurality of topic items; 5) accessing an individual help file of either the first set of help files or the second set of help files, the accessed individual help file corresponds to the selected one of the topic items; and 6) displaying information contained in the individual help file.

12 Claims, 8 Drawing Sheets

**APPLICATION 1
HELP FILE DIRECTORY**

| HELP TOPIC A1 DESCRIPTOR | TOPIC A1 FILE IDENTIFIER | TOPIC A1 FILE INDEX |
|---|---|---|
| HELP SUB-TOPIC Aa1 DESCRIPTOR | SUB-TOPIC Aa1 FILE IDENTIFIER | SUB-TOPIC Aa1 FILE INDEX |
| HELP TOPIC B1 DESCRIPTOR | TOPIC B1 FILE IDENTIFIER | TOPIC B1 FILE INDEX |
| ⋮ | | |
| END OF DIRECTORY | | |

FIGURE 4A

**APPLICATION 2
HELP FILE DIRECTORY**

| HELP TOPIC A2 DESCRIPTOR | TOPIC A2 FILE IDENTIFIER | TOPIC A2 FILE INDEX |
|---|---|---|
| HELP SUB-TOPIC B2 DESCRIPTOR | TOPIC B2 FILE IDENTIFIER | TOPIC B2 FILE INDEX |
| HELP TOPIC C2 DESCRIPTOR | TOPIC C2 FILE IDENTIFIER | TOPIC C2 FILE INDEX |
| HELP SUB-TOPIC Ca2 DESCRIPTOR | SUB-TOPIC Ca2 FILE IDENTIFIER | SUB-TOPIC Ca2 FILE INDEX |
| ⋮ | | |
| END OF DIRECTORY | | |

FIGURE 4B

HIERARCHICAL INTEGRATED HELP UTILITY FOR A COMPUTER SYSTEM

BACKGROUND OF THE INVENTION

1. Field of the Invention

The present invention relates to the field of user interactive computer systems. Specifically, the present invention relates to the manipulation and the display of help information on a computer display.

2. Description of Related Art

Conventional computer systems usually provide help information to a user in some form. Typically, help files are initially installed in a computer system and made accessible to a computer user in various ways. In some systems, the installed help files are simply listed for selection by a user. In other systems, a context sensitive help utility displays specific help information as a particular command or menu item is selected. In still other systems, the cursor position and the particular region of the display in which it is located is used to activate a particular help file related to that portion of the display screen.

In addition to various help utility implementations, conventional computer systems typically provide a means for running multiple application programs, usually under a single operating system program. In some cases, multiple operating systems are supported. In most cases, these application programs and/or operating systems are developed and distributed by more than one software vendor. As a result, it is not uncommon to encounter various help utility implementations. In most cases, the help utility implementations are incompatible between various applications and/or operating systems. Thus, help utilities tend to be application or operating system specific. Because various operating systems and applications have different user interface functionality, different organizational structures, and different help file naming conventions, providing an integrated help utility that operates across more than one application has proven difficult. Because conventional help utilities are application specific, prior art help utilities cannot provide a hierarchical organizational structure that spans multiple independent applications.

Thus, a hierarchical integrated help utility that integrates help information across multiple independent applications is required.

SUMMARY OF THE INVENTION

The present invention is an apparatus and method for providing a hierarchical integrated help utility that integrates help information across multiple independent applications. In a computer system having a first application program including a first set of help files and a second application program including a second set of help files, the integrated help utility of the present invention includes a process for displaying selected information in the first and second help files, the process comprises the steps of: 1) providing a first help directory associated with the first set of help files, the first help directory includes a first plurality of topic items corresponding to information provided in the first set of help files; 2) providing a second help directory associated with the second set of help files, the second help directory includes a second plurality of topic items corresponding to information provided in the second set of help files; 3) displaying the first plurality of topic items concurrently with the second plurality of topic items; 4) selecting a selected one of the topic items from either the first plurality of topic items or the second plurality of topic items; 5) accessing an individual help file of either the first set of help files or the second set of help files, the accessed individual help file corresponds to the selected one of the topic items; and 6) displaying information contained in the individual help file.

It is therefore an advantage of the present invention to provide a hierarchical integrated help utility that integrates help information across multiple independent applications. It is a further advantage of the present invention to provide a selectively sized outline view of all help category titles, topics, and subtopics in a single window display. It is a further advantage of the present invention that a help utility enables full text searching across all or a selected subset of help titles integrated from multiple applications. It is a further advantage of the present invention that the help utility displays hierarchical help topics and subtopics in a single window. It is a further advantage of the present invention that the help utility automatically recognizes the installation of new applications and includes help information topics from the newly installed application into the displayed help information directory without explicit instructions from the user.

These and other advantages of the present invention are fully described in the following detailed description of the preferred embodiment.

BRIEF DESCRIPTION OF THE DRAWINGS

FIGS. 4A and 4B illustrate an example of a help file directory for two applications.

DETAILED DESCRIPTION OF THE PREFERRED EMBODIMENT

The present invention is an apparatus and method providing a hierarchical integrated help utility that integrates help information across multiple independent applications. In the following detailed descriptions, numerous specific details are set forth to provide a thorough understanding of the present invention. However, it will be apparent to one of ordinary skill in the art that these specific details need not be used to practice the present invention. In other instances, well know structures, interfaces, and processes have not been shown in detail in order not to unnecessarily obscure the present invention.

Figure 1:
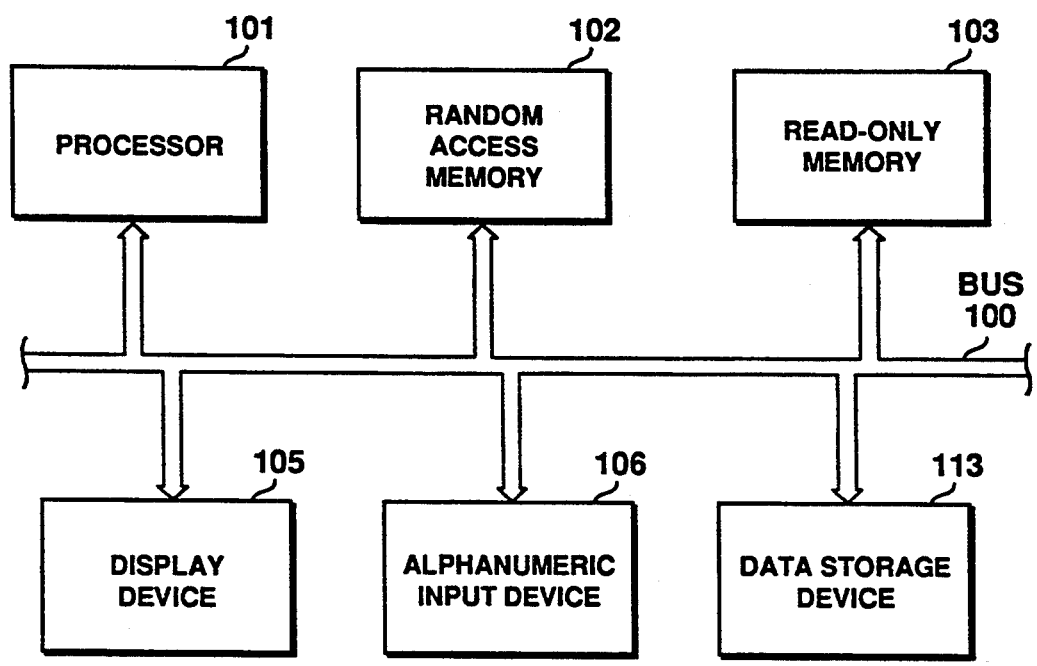
FIG. 1 is a block diagram illustrating the computer system hardware used in the preferred embodiment of the present invention.

Referring now to FIG. 1, a block diagram of the computer system hardware used in the preferred embodiment of the present invention is illustrated. The computer system used in the preferred embodiment comprises a bus 100 for communicating information between computer system components. These components, coupled to bus 100, include processor 101. In the preferred embodiment, processor 101 is an i486 brand microprocessor manufactured by Intel Corporation, Santa Clara, Calif. The mark i486 is a registered trademark of Intel Corporation. Other system components of the computer system include random excess memory (RAM) 102, read only memory (ROM) 103, and mass storage device or disk drive 104. The computer system of the preferred embodiment also includes display device 105 coupled to the bus 100 for displaying information to a computer user, an alphanumeric input device 106 coupled to the bus for communicating information and command selections to the processor 101, a cursor control device or pointing device 107 coupled to the bus 100 for communicating information and command selections to processor 101, and a signal generation device or mouse button 108 coupled to the bus 100 for communicating command selections to processor 101. Display device 105 may be a liquid crystal device, cathode ray tube, or other suitable display device. Alphanumeric input device 106 is typically an alphanumeric or function key keyboard. Pointing device or cursor control device 107 is typically a mouse or trackball device allowing the computer user to dynamically signal the two dimensional movement of a visible symbol (i.e. cursor) on the display screen of display device 105. Many implementations of the cursor control device 107 are well known in the art, including trackball, mouse, joystick, or special keys on the alphanumeric input device 106 capable of signaling movement in a given direction. Signal generation device 108 is typically implemented as a button or switch located on or near the cursor control device 107. The physical proximity of cursor control device 107 and signal generation device 108 allows the user to manipulate both devices simultaneously with one hand. The signal generation device may be operated between two control states: an active control state typically initiated by depression of a mouse button, and an inactive control state typically initiated by releasing the mouse button. The configuration and interconnection of computer system components as illustrated in FIG. 1 is well known to those of ordinary skill in the art.

Figure 2:
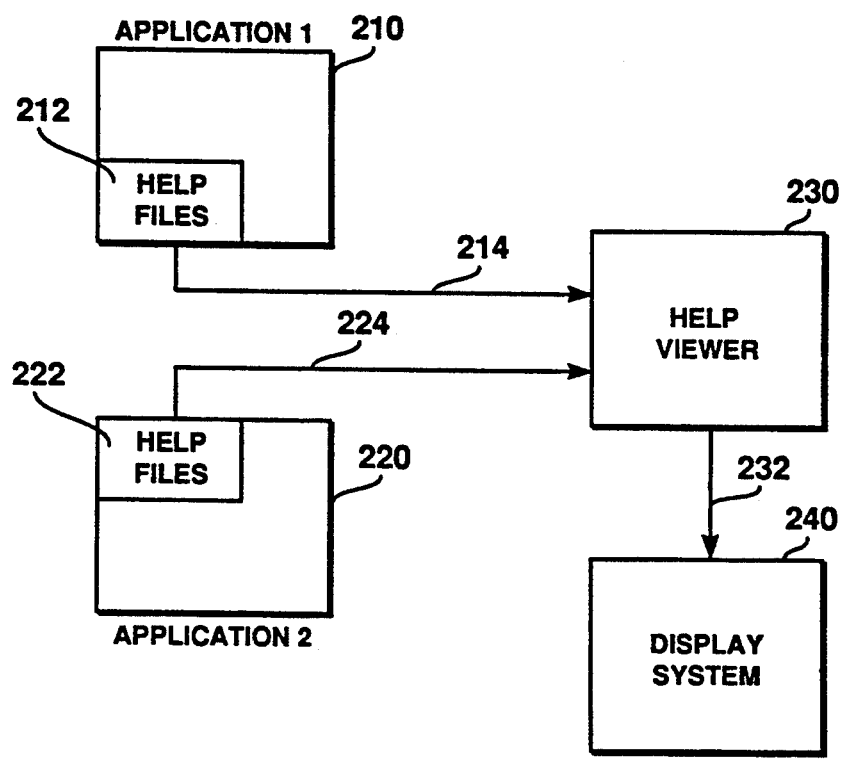
FIG. 2 illustrates a typical prior art help utility implementation.

Referring now to FIG. 2, a typical prior art help utility implementation is illustrated. Typically, application programs in the prior art are provided with a help file or a set of help files. These help files provide information on the use of various commands or functions provided by the application. Two such sample applications are illustrated in FIG. 2. Application 210 is provided with help files 212. Application 220 is provided with help files 222. In some conventional computer systems, the help files associated with a particular application are only accessible from within the application itself. This is because only the application itself is aware of the organizational structure and help file naming convention used by a particular application. Thus, a user executing a particular application uses the functionality of the application to access the application help files. Depending upon the help information requested by a user, the application itself or a help utility provided with the application accesses its corresponding help files to select the particular help file requested by the user. This help file or a help file identifier is provided to a help viewer utility 230 that formats the help information for output to display system 240. In this prior art configuration, help viewer 230 is used mainly to access and display a named selected file. Help viewer 230 is not aware of the organizational structure or help file naming convention used by a particular application. In prior art systems, it is a particular application's responsibility to provide a selected help file or help file identifier to help viewer 230. As shown in FIG. 2, application 210 provides a selected help file or an identifier of a selected help file to help viewer 230 via line 214. Similarly, a different application, such as application 220, provides selected help file information to help viewer 230 via line 224. It will be apparent to one of ordinary skill in the art that the help file utility and help file information of application 210 is independent and not integrated with the help utility and help information file of application 220. Thus, application 210 typically has no access to help files 222 of application 220. Similarly, the help utility of application 220 has no access to help files 212 of application 210. It is apparent that the prior art help utility configuration is not an integrated help utility system. Further, because both application 210 and application 220 provide their own independent help utilities, unnecessary redundancy in help functionality is present in the prior art.

Figure 3:
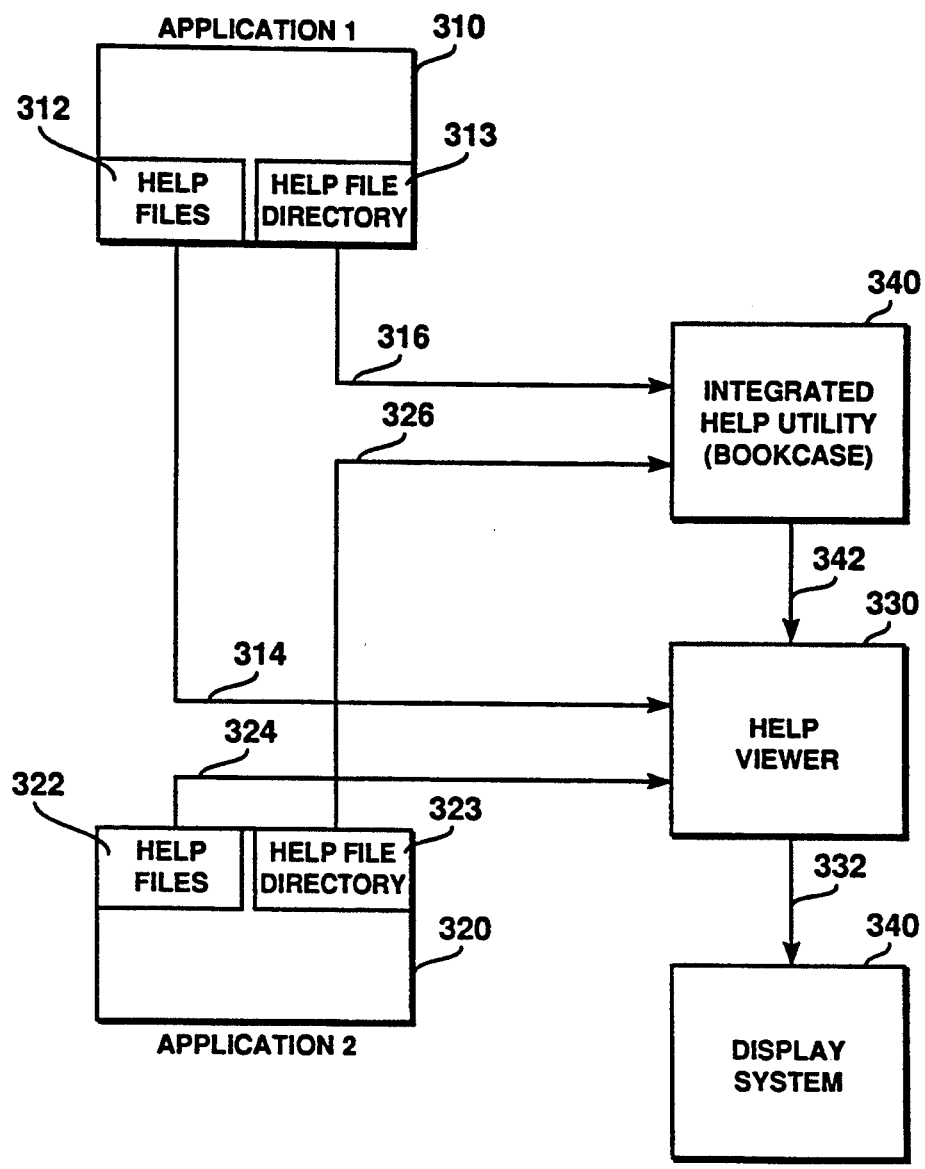
FIG. 3 illustrates the structure of the integrated help utility of the present invention.

Referring now to FIG. 3, the integrated help utility of the present invention is illustrated. In a manner building upon the configuration provided in the prior art, independent applications 310 and 320 comprise independent application programs including corresponding help files 312 and 322. These applications and help files correspond to similar applications and help files illustrated in FIG. 2. Similarly, the help viewer 330 for displaying a named selected file on display system 343 corresponds to the same help viewer 230 illustrated in FIG. 2.

The present invention improves the conventional help utility functionality by providing help file directory 313 within application 310, help file directory 323 within application 320, and the integrated help utility 340 as described herein. Search utility 341 is also provided as part of the present invention. Help file directory 313 comprises a table of contents or outline of the help file topics provided in help files 312 of application 310. Similarly, help file directory 323 provides an outline of help file topics provided in help files 322 of application 320. Integrated help utility 340 uses the help file directories 313 and 323 to display a hierarchical and integrated listing of help file topics from multiple applications (i.e. application 310 and application 320). In this manner, help file topics resident in application 320 may be viewed while a user is executing application 310. Help file topics provided in help files 312 may also be viewed while a user is executing application 320. Help files of a particular application may also be viewed even though the application is not active. The integrated help utility 340 of the present invention provides a level of help file integration not provided in prior art systems.

Referring now to FIGS. 4A and 4B, two examples of the content of a help file directory are illustrated. FIG. 4A illustrates an example of the content of help file directory 313 illustrated in FIG. 3. FIG. 4B illustrates an example of the content of help file directory 323. It will be apparent to one of ordinary skill in the art that the actual content of the help file directories illustrated in FIGS. 4A and 4B may vary. The basic structure of the help file directory, however, will remain basically the same.

Referring now to FIG. 4A, the help file directory example of application 1 comprises a topic or subtopic descriptor 410, a topic or subtopic file identifier 420, and a topic or subtopic file index 430. Descriptors 410 comprise a representation of an alphanumeric string or graphic icon that specifies the help file content for a particular topic or subtopic within help files 312. Descriptors 410 represent help file topic information suitable for display to a user. File identifiers 420 represent the file name or path representation compatible with a particular file system that defines the location of a help file within help files 312 that corresponds to the associated descriptor 410. In FIG. 4A for example, topic A1 file identifier of file identifiers 420 identifies a file name or path of a help file that corresponds to the help topic A1 descriptor of descriptors 410. Similarly, the help file directory illustrated in FIG. 4A associates file identifiers 420 and descriptors 410 for other help topics and subtopics provided within the application. Because a particular help file may contain help information for multiple topics or subtopics, a file index 430 is provided to more specifically define the location of help information corresponding to descriptors 410. File index 430 defines the particular location within a file identified by file identifiers 420 at which help information corresponding to descriptors 410 resides. Thus, the help file directory of the present invention forms an association between displayed help topic descriptors 410 and the location of help files containing information related to the topic descriptors as defined by a file identifier 420 and a file index 430. It will apparent to one of ordinary skill in the art that other methods for defining the location of help file information in a particular computer system may equivalently be implemented.

Referring now to FIG. 4B, a further example of the content of a help file directory for application 320 is illustrated. In this example, the help file directory contains descriptors 450 for a different set of help topics corresponding application 320. Similarly, a set of file identifiers 460 and file indices 470 define a location of help files corresponding to the descriptors 450 of application 320. Note that the help file directory may contain an arbitrary number of descriptors, file identifiers, and file indices as needed for describing the set of topics or subtopics available in the help files for a particular application.

A help file directory header 441 and 445 is also provided in each help file directory. The header provides control information related to the help file directory such as the version number of the directory, a file type or tag ID that identifies the file as a help directory, and a record count that identifies the number of items in the directory. It will be apparent to those of ordinary skill in the art that other control information may be provided in the directory header.

Figure 5:
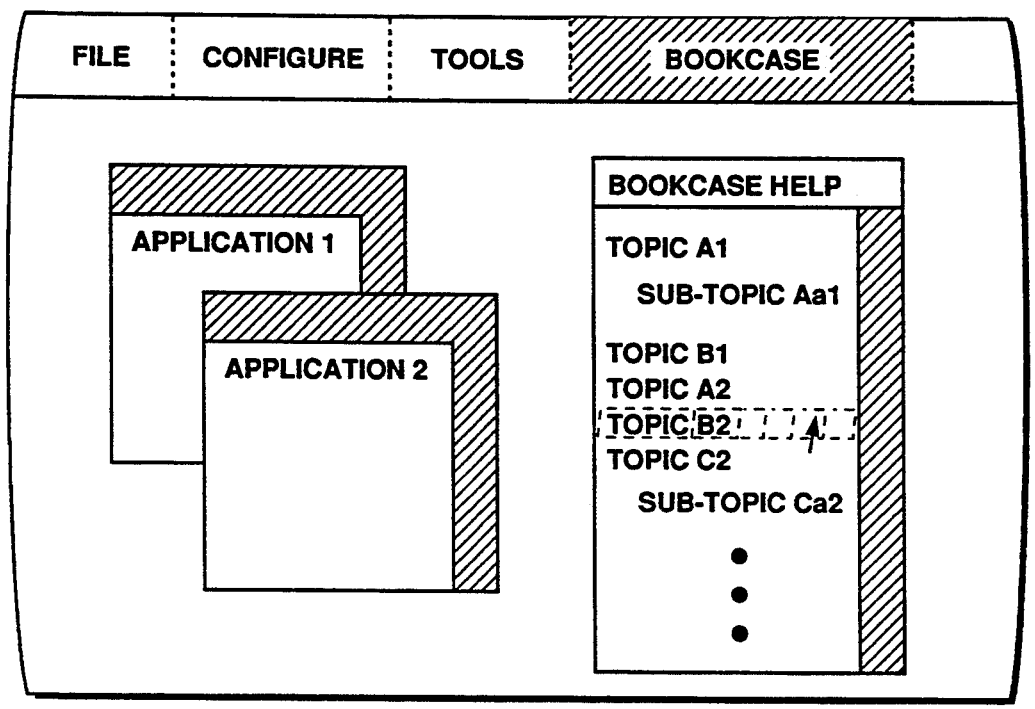
FIG. 5 illustrates a typical screen display provided by the present invention.

Referring now to FIG. 5, a typical screen display provided with the present invention is illustrated. It will be apparent to one of ordinary skill in the art that the present invention is not limited to the particular screen display format illustrated in FIG. 5. Rather, the example of FIG. 5 is provided for the purpose of explaining the operation of the present invention. FIG. 5 illustrates a set of windows that may be displayed as a user invokes multiple applications along with the present invention. In the preferred embodiment, the integrated help utility of the present invention is activated using a menu selection 512 provided at the top of the display screen. Note that other mechanisms may equivalently be used for activating the integrated help utility of the present invention. In the preferred embodiment, the integrated help utility of the present invention is denoted "BOOKCASE". Upon activation of the command selection 512, a window 530 is created using conventional operating system calls. Window 530 represents the display area used by the integrated help utility of the present invention for displaying a table of contents or outline of help information topics provided across multiple applications.

As illustrated in the example of FIG. 5, a window 510 corresponding to application 310 illustrated in FIG. 3 is displayed. Similarly, a window 520 corresponding to application 320 illustrated in FIG. 3 is also displayed in FIG. 5. The applications corresponding to windows 510 and 520 each have corresponding help files. As part of the present invention, each of these applications also has a corresponding help file directory as described in connection with FIGS. 3, 4A and 4B. A particular application may have more than one help file directory. The information from these help file directories is used to display information in window 530. The content of integrated help utility window 530 illustrated in FIG. 5 represents an example of the information displayed by the present invention for the example help file directories illustrated in FIGS. 4A and 4B. For example, the sample help topic 540 illustrated in window 530 of FIG. 5 corresponds to help topic descriptor 440 illustrated in FIG. 4A. Similarly, help subtopic 542 illustrated in window 530 corresponds to subtopic descriptor 442 illustrated in FIG. 4A. Each descriptor 410 of the help file directory of the example illustrated in FIG. 4A is displayed as a separate line item in window 530. In a similar manner, the help descriptors 450 illustrated in FIG. 4B are also displayed as separate line items in window 530. For example, help topic 546 corresponds to help topic descriptor 446 illustrated in FIG. 4B. Topic 548 displayed in window 530 corresponds to help topic descriptor 448 illustrated in FIG. 4B. The integrated help utility of the present invention displays help file directory information in window 530 for the help file directory of each application currently installed on a particular computer system.

Once the help topic or subtopic descriptors are illustrated, a computer user may use a cursor control device to select a topic or subtopic from within window 530. In the example of FIG. 5, cursor 460 has been positioned at topic 548 of help utility window 530. This particular help topic may be selected for display by a user by activation of the signal generation device or mouse button of the computer system. Once this selection is made, the integrated help utility of the present invention accesses the file identifier and file index corresponding to the selected topic descriptor. For the example illustrated in FIG. 5, topic 548 has been selected. Once this occurs, the integrated help utility of the present invention accesses file identifier 468 and file index 478 corresponding to the help topic descriptor 448 illustrated in FIG. 4B. The file identifier 468 and file index 478 is extracted from the help file directory or a corresponding help utility storage area by the integrated help utility 340 of the present invention. The file identifier and file index so extracted is formatted into a context string compatible with help viewer 330 illustrated in FIG. 3. This context string that uniquely identifies the location of the selected help information is transferred to help viewer 330 by integrated help utility 340 on line 342 as illustrated in FIG. 3. In a conventional manner, help viewer 330 accesses the specified help information and displays the information on display system 343. Thus, the present invention integrates the display and selection of help directory information from multiple applications into a single window.

The present invention also provides a searching capability for searching the help directory for items that match a search string or set of search criteria provided by a user. Conventional methods are used for defining a particular search criteria protocol. A particular set of search criteria are passed to search utility 341 illustrated in FIG. 3. These search criteria are parsed by search utility 341. Help utility 340 and search utility 341 operate cooperatively to search the available help file directories for topics or sub-topics that match the search criteria. The matching topic or sub-topic items are then displayed by the present invention in the help utility window 530 illustrated in FIG. 5. This searching process is described in more detail in connection with the processing flowchart of FIG. 8.

Figure 6:
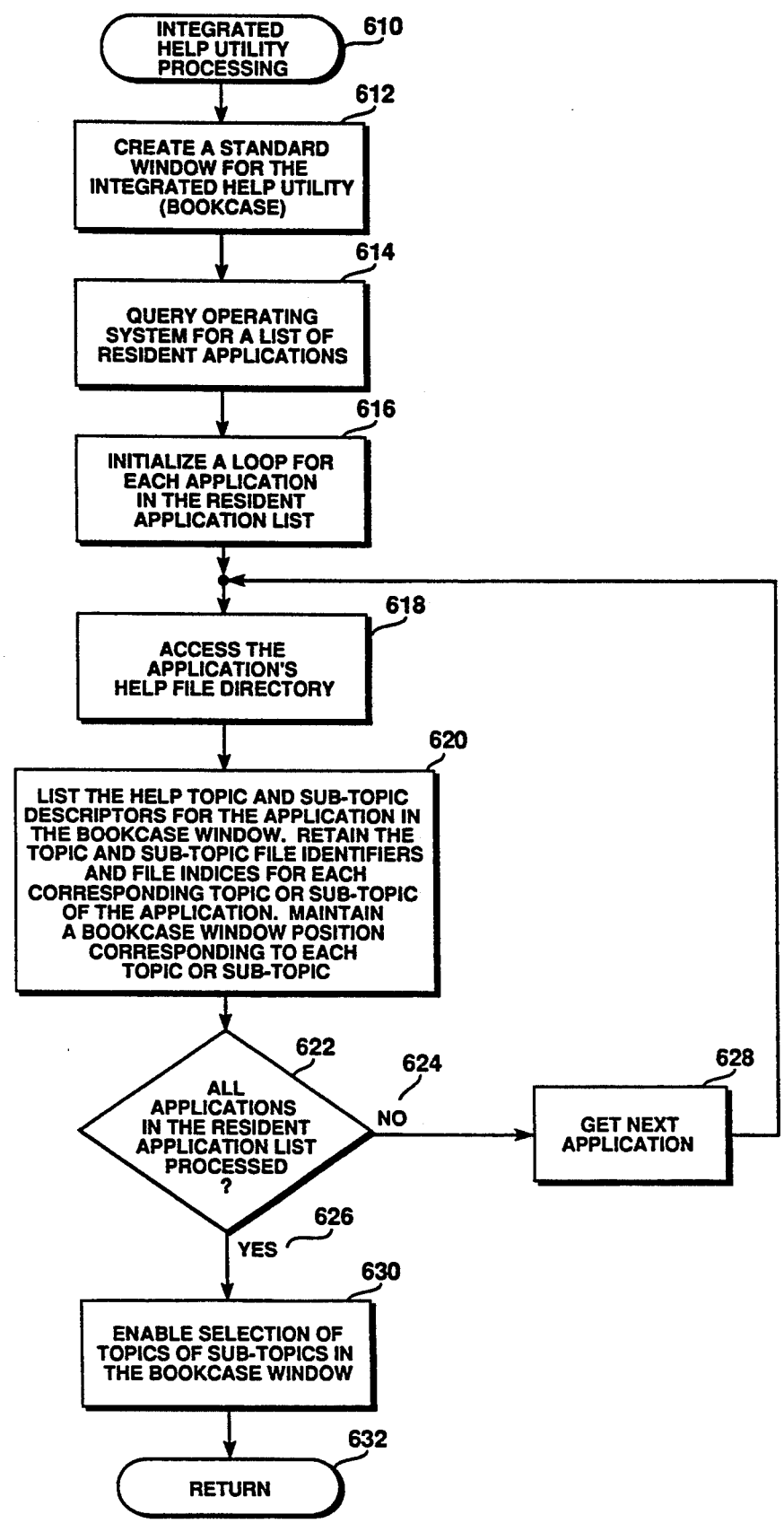
FIGS. 6-8 are flow charts illustrating the processing logic of the present invention.
Figure 7:
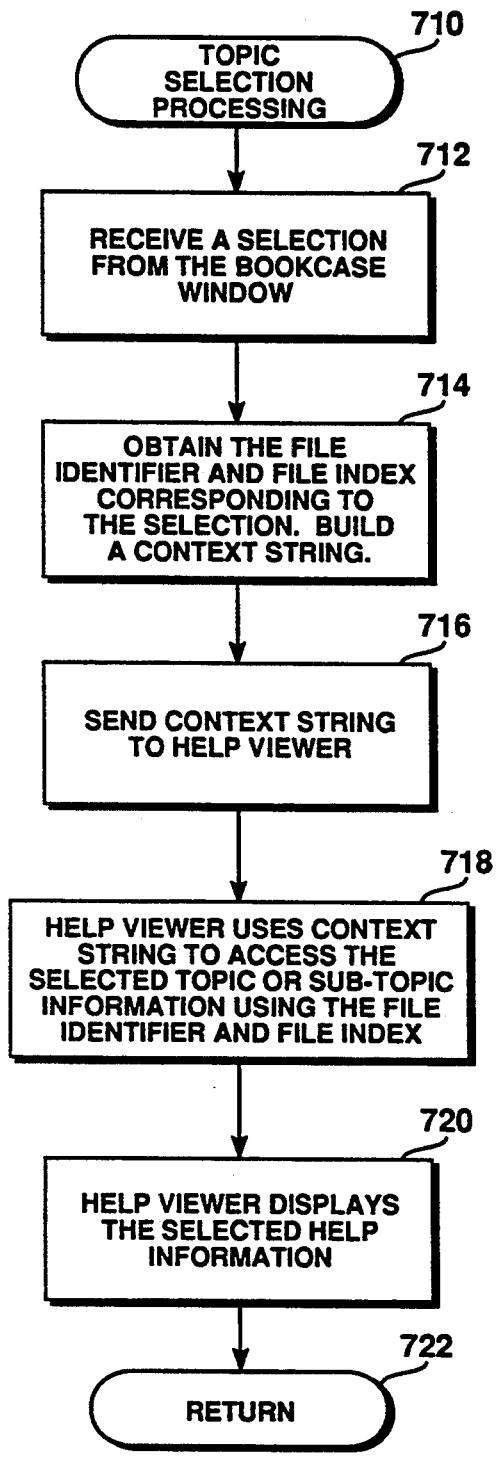
Figure 8:
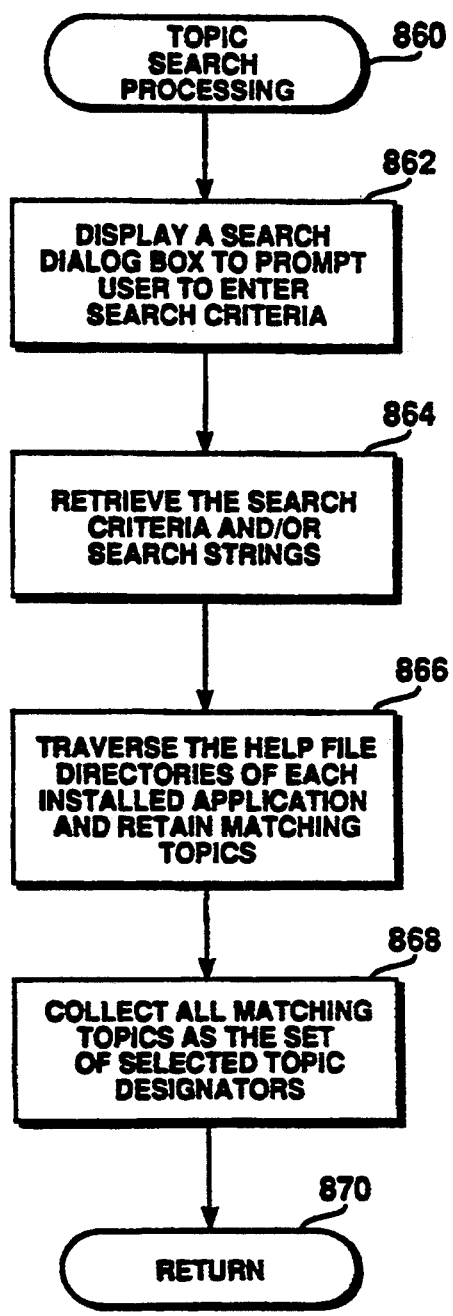

Referring now to FIGS. 6–8, the processing logic of the present invention is illustrated. The processing logic of the preferred embodiment is operably disposed within random access memory 102 and executed by processor 101 of the computer system described in reference to FIG. 1. This processing logic can be a separately compiled or loaded entity or incorporated as part of a larger operating system or application software package. In either case, a means for activating the processing logic of the present invention may be performed using techniques well known to those of ordinary skill in the art. Once activated, the processing logic of the present invention operates in the manner described below in connection with the flowcharts of FIGS. 6 and 7.

Referring now to FIG. 6, the integrated help utility processing of the present invention is illustrated. As an initial step, a standard window or display region for the display of help directory information (denoted the help utility window) is created in processing block 612. Next, the help utility of the present invention uses the operating system to generate a list of application programs currently installed within the system (processing block 614). Next, the help utility prepares to enter a loop for each application in the installed application list. This loop is entered at processing block 618. In a first processing step of this loop, the help file directory of the application currently being processed is accessed. The help topic and subtopic descriptors for the application are extracted from the help file directory and listed in the help utility window created in processing block 612. The topic and subtopic file identifiers and file indices corresponding to the displayed descriptors are retained in a help utility storage area. These file identifiers and file indices are accessed if a particular topic descriptor is selected by a user. To facilitate the selection process, a window position is maintained for each topic or subtopic descriptor displayed in the help utility window. In this manner, a particular cursor position may be associated with each descriptor displayed in the help utility window (processing block 620). Each of the applications in the installed application list is processed in this manner. A loop between decision block 622 and processing block 618 continues until each application in the installed application list has been processed. At the completion of this loop, the help utility window will display help topic designators for each application resident on the system. Topic hierarchy is conveyed by displaying subtopics as indented under corresponding topics. Finally, the selection of topics or subtopics in the help utility window is enabled in processing block 630. Processing for the initial activation of the integrated help utility then terminates through the return bubble 632 illustrated in FIG. 6.

Referring now to FIG. 7, help utility processing for the selection of a particular help topic or subtopic designator is illustrated at bubble 710. If a search of help topics is requested by the user, processing path 713 is taken to processing block 717 where the search is performed. This process is described in detail in connection with FIG. 8. Otherwise, a selection of help topics can be manually entered by the user (processing path 715). In either case, a topic selection is generated and provided to the help utility in processing block 712. The file identifier and file index corresponding to the selected designator is obtained in processing block 714. Using the file identifier and file index, a context string uniquely identifying the help information corresponding to the selected help designator is built (processing block 714). This context string is sent to the help viewer in processing block 716. The help viewer uses this context string to access the help information for the selected topic or subtopic. The file identifier and file index provided in the context string enables this process (processing block 718). Once the help information so specified has been obtained, the help viewer displays the selected help information in processing block 720. The help utility selection processing then terminates through the return bubble 722 illustrated in FIG. 7.

Referring now to FIG. 8, the topic searching logic used by the present invention is illustrated. If a topic search is requested by a user, a search dialog box is displayed in processing block 862. This dialog box prompts the user to enter a set of search criteria and/or a search string. Conventional search protocols are used to define the format of the search criteria and search string. The search criteria and search string are retrieved by the present invention in processing block 864. These search criteria and search string(s) are used to traverse the help file directories of each installed application for matching topics. The matching topics are retained (processing block 866). The matching topics are collected as the set of selected topic designators in processing block 868. This set of selected topic designators are then provided to the processing logic illustrated in FIG. 7 at processing block 712 through the return bubble 870 illustrated in FIG. 8.

As an extension of the present invention, hypertext constructs within the help file information can be supported. These constructs are supported in the conventional help viewer and displayed as a user selects a particular topic and information contained therein. In this manner, help information is hierarchically organized in the help utility window.

Thus, an improved method and apparatus for hierarchically integrating help information across multiple applications is disclosed. These specific arrangement and methods herein are merely illustrative of the principles of this invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

We claim:

1. In a computer system having a first application program including a first set of help files and a second application program including a second set of help files, an integrated help utility for displaying said first and second help files, said integrated help utility comprising:

a first help directory associated with said first set of help files, said first help directory including a first plurality of topic items corresponding to information provided in said first set of help files;

a second help directory associated with said second set of help files, said second help directory including a second plurality of topic items corresponding to information provided in said second set of help files;

means for displaying said first plurality of topic items concurrently with said second plurality of topic items;

means for selecting a selected one of said topic items from either said first plurality of topic items or said second plurality of topic items;

means for accessing an individual help file of either said first set of help files or said second set of help files, said accessed individual help file corresponding to said selected one of said topic items; and means for displaying information contained in said individual help file.

2. The integrated help utility as claimed in claim 1 wherein said computer system further includes a cursor control device and a signal generation device, said means for selecting being responsive to said cursor control device and said signal generation device.

3. The integrated help utility as claimed in claim 1 wherein said means for displaying said first plurality of topic items concurrently with said second plurality of topic items displays said topic items in a single window.

4. The integrated help utility as claimed in claim 1 wherein said first help directory and said second help directory both comprise a set of topic descriptors, a set of help file identifiers corresponding to said topic descriptors, and a set of file indices corresponding to said topic descriptors and said help file identifiers.

5. The integrated help utility as claimed in claim 1 wherein said first help directory and said second help directory both include hypertext constructs.

6. The integrated help utility as claimed in claim 1 further including means for building a context string that uniquely identifies information in said individual help file.

7. In a computer system having a first application program including a first set of help files and a second application program including a second set of help files, a process for displaying selected information in said first and second help files, said process comprising the steps of:

providing a first help directory associated with said first set of help files, said first help directory including a first plurality of topic items corresponding to information provided in said first set of help files;

providing a second help directory associated with said second set of help files, said second help directory including a second plurality of topic items corresponding to information provided in said second set of help files;

displaying said first plurality of topic items concurrently with said second plurality of topic items;

selecting a selected one of said topic items from either said first plurality of topic items or said second plurality of topic items;

accessing an individual help file of either said first set of help files or said second set of help files, said accessed individual help file corresponding to said selected one of said topic items; and displaying information contained in said individual help file.

8. The process as claimed in claim 7 wherein said computer system further includes a cursor control device and a signal generation device, said step of selecting being responsive to said cursor control device and said signal generation device.

9. The process as claimed in claim 7 wherein said step of displaying said first plurality of topic items concurrently with said second plurality of topic items displays said topic items is performed in a single window.

10. The process as claimed in claim 7 wherein said first help directory and said second help directory both comprise a set of topic descriptors, a set of help file identifiers corresponding to said topic descriptors, and a set of file indices corresponding to said topic descriptors and said help file identifiers.

11. The process as claimed in claim 7 wherein said first help directory and said second help directory both include hypertext constructs.

12. The process as claimed in claim 7 further including a step of building a context string that uniquely identifies information in said individual help file.

* * * * *